United States Patent [19]

Martz et al.

[11] Patent Number: 5,397,602
[45] Date of Patent: Mar. 14, 1995

[54] MODIFIED CHLORINATED POLYOLEFINS, AQUEOUS DISPERSIONS THEREOF AND THEIR USE IN COATING COMPOSITIONS

[75] Inventors: Jonathan T. Martz, Glenshaw; Christopher A. Verardi, Pittsburgh; Shanti Swarup, Gibsonia, all of Pa.

[73] Assignee: PPG Industries, Inc., Pittsburgh, Pa.

[21] Appl. No.: 213,280

[22] Filed: Mar. 15, 1994

Related U.S. Application Data

[62] Division of Ser. No. 24,561, Mar. 1, 1993, Pat. No. 5,319,032.

[51] Int. Cl.⁶ .............................................. B05D 3/02
[52] U.S. Cl. .............................. 427/343.5; 427/412.1; 427/412.3
[58] Field of Search ............... 427/393.5, 412.1, 412.3; 525/301, 301.5, 334.5, 386

[56] References Cited

U.S. PATENT DOCUMENTS

| | | | |
|---|---|---|---|
| 4,486,573 | 12/1984 | Hayashi | 525/301 |
| 5,102,944 | 4/1992 | Ohmika et al. | 524/501 |
| 5,169,888 | 12/1992 | Sales | 524/267 |
| 5,218,031 | 6/1993 | Nayder et al. | 524/376 |

FOREIGN PATENT DOCUMENTS 1-256556 10/1989 Japan .
90/12056 10/1990 WIPO .
90/12656 11/1990 WIPO .

*Primary Examiner*—Michael Lusignan
*Attorney, Agent, or Firm*—Krisanne Shideler; William J. Uhl

[57] ABSTRACT

Modified chlorinated polyolefins obtained by heating the chlorinated polyolefin with a hydrocarbon acid having at least 7 carbon atoms in the presence of a free radical initiator are disclosed. The modified chlorinated polyolefins can be formulated into aqueous dispersions and coated onto plastic substrates to improve the adhesion of subsequently applied coatings.

30 Claims, No Drawings

MODIFIED CHLORINATED POLYOLEFINS, AQUEOUS DISPERSIONS THEREOF AND THEIR USE IN COATING COMPOSITIONS

This is a division of application Ser. No. 08/024,561, filed Mar. 1, 1993, now U.S. Pat. No. 5,319,032.

FIELD OF THE INVENTION

The present invention relates to modified chlorinated polyolefins, aqueous dispersions thereof, and methods of coating a plastic substrate with the aqueous dispersions.

BACKGROUND OF THE INVENTION

Plastic substrates are commonly used in automotive parts and accessories, containers, household appliances, and other commercial items. Organic coating compositions are very often applied to these substrates for decorative and protective purposes. These plastic substrates are made of a variety of thermosetting and thermoplastic materials having widely varying surface properties including surface tension, roughness, and flexibility, which make it difficult to achieve adequate adhesion of organic coatings to such materials, particularly after aging or environmental exposure of the plastic materials. It is desirable to have a coating composition which can be used to coat various plastic substrates in order to promote adhesion of subsequently applied coatings on the substrate.

Moreover, in automotive applications, it is desirable to provide a coating composition which exhibits compatibility with subsequently applied coatings, stability with respect to long-term storage, resistance to gasoline, acids, and other chemicals, resistance to humidity, and excellent appearance.

SUMMARY OF THE INVENTION

In accordance with the present invention, a modified chlorinated polyolefin is provided, obtained by heating the chlorinated polyolefin with a hydrocarbon acid having at least 7 carbon atoms in the presence of a free radical initiator. Also provided are aqueous dispersions containing about 0 to about 40 percent by weight of a water-reducible urethane resin, about 0 to about 40 percent by weight of an acrylic latex, and about 20 to about 100 percent by weight of the modified chlorinated polyolefin, based on total resin solids. A method of coating a plastic substrate is also provided in accordance with the present invention.

DETAILED DESCRIPTION

The modified chlorinated polyolefin of the present invention is obtained by heating a chlorinated polyolefin with a hydrocarbon acid having at least 7 carbon atoms in the presence of a free radical initiator.

Suitable chlorinated polyolefins include chlorinated polyethylene, chlorinated polypropylene, and mixtures thereof. Chlorinated polypropylene is preferred. The chlorinated polyolefins preferably have a chlorine content of from about 10 to about 40 weight percent, more preferably from about 10 to about 30 weight percent, and most preferably from about 18 to about 22 weight percent based on the weight of polyolefin; i.e., the unchlorinated polyolefin. The chlorinated polyolefins used in the present invention are solids, preferably in powder or pelletized form, and have a melting point in the range of about 150° F. to about 350° F., preferably from about 150° F. to about 250° F., and most preferably from about 180° F. to about 210° F. The weight average molecular weight of the chlorinated polyolefins range from about 10,000 to about 50,000, preferably from about 10,000 to about 35,000, and most preferably from about 15,000 to about 35,000, as determined by gel permeation chromatography using a polystyrene standard. Suitable chlorinated polyolefins for use in the present invention include materials commercially available from Eastman Chemical Products, Inc., of Rochester, N.Y. A chlorinated polypropylene available from Eastman Chemicals under the trademark CP343-1 is preferred.

The hydrocarbon acid used in the formation of the modified chlorinated polyolefin may be an acid having a hydrocarbon chain of at least 7 carbon atoms, usually about 7 to about 54 carbon atoms, and preferably about 11 to about 20 carbon atoms. The hydrocarbon acid is preferably aliphatic and may be saturated or unsaturated, which is preferred. The acid may be polycarboxylic, but is preferably monocarboxylic. Suitable acids include hydrocarbon acids such as lauric acid, oleic acid, ricinoleic acid, and undecylenic acid. Undecylenic acid is most preferred.

Free radical initiators suitable for use in the reaction of the chlorinated polyolefin with the hydrocarbon acid include butyl peroxy-2-ethylhexanoate, t-butyl peroctoate, t-amyl peroctoate, benzoyl peroxide, and VAZO 52, an azo free radical initiator commercially available from E. I. DuPont de Nemours and Company. Benzoyl peroxide is preferred.

The modified chlorinated polyolefin is prepared by heating the chlorinated polyolefin with the hydrocarbon acid in the presence of the free radical initiator for a time sufficient to cause a reaction to occur, and then cooling the reaction mixture. Typically heating is within the range of about 80° to 120° C., preferably about 90° to 110° C. for a time of about 0.5 to 4, preferably 1 to 2 hours.

The weight ratio of chlorinated polyolefin to hydrocarbon acid used in making the modified chlorinated polyolefin is usually from about 60:40 to about 80:20, preferably about 75:25. The acid value of the modified chlorinated polyolefin may be in the range of about 50 to 100, preferably from about 60 to 90, and most preferably from about 70 to 80.

The modified chlorinated polyolefin may be partially or totally neutralized so as to allow for dispersion in water. Examples of suitable neutralizing agents are primary, secondary, or tertiary amines such as ammonia, tris(hydroxymethyl)amino methane, N,N-dimethyl ethanolamine, 2-amino-2-methyl propanediol, triethyl amine, and diisopropanolamine. Diisopropanolamine and N,N-dimethyl ethanolamine are preferred. The extent of neutralization is typically at least 75% of the total theoretical neutralization.

The neutralized modified chlorinated polyolefin may be dispersed into aqueous medium, preferably with the aid of an organic cosolvent. Cosolvents used in aiding dispersion of the modified chlorinated polyolefin in water may include lower alkyl monofunctional alcohols such as n-butanol and glycol ether alcohols such as ethylene glycol hexyl ether, propylene glycol methyl ether, dipropylene glycol methyl ether, and propylene glycol phenyl ether, which is preferred. When used, the organic cosolvent is present in amounts of up to 25% by weight, based on the combined weight of the hydrocarbon acid and chlorinated polyolefin.

The aqueous dispersions of the present invention can be used in a method of coating plastic substrates. When used as coatings, the aqueous dispersions preferably also contain one or more other resinous ingredients such as water-reducible urethane resins and acrylic latices and-/or dispersions. Dispersions formulated with these additional resins and applied as coatings to a substrate provide enhanced adhesion of subsequently applied coatings, as well as humidity resistance, gasoline and other chemical resistance, and excellent appearance of subsequently applied and cured films.

When used as a coating, the aqueous dispersion of the present invention contains about 20 to 100%, preferably about 30 to 40%, and most preferably about 35% by weight of the modified chlorinated polyolefin described above, about 0 to 40%, preferably about 20 to 30%, and most preferably about 25% by weight of a water-reducible urethane resin, and about 0 to 40%, preferably about 35 to 45%, most preferably about 40% by weight of an acrylic latex, based on total weight of resin solids. Suitable water-reducible urethane resins include those described in U.S. Pat. Nos. 4,046,729; 4,066,591; 4,147,679 and 4,403,085. Suitable acrylic latices include those described in U.S. Pat. No. 5,071,904 and resins commercially available from Rohm and Haas under the trademark RHOPLEX; i.e., RHOPLEX WL-91, RHOPLEX WL-96, and RHOPLEX AC-264, which is preferred. The aqueous dispersion of the present invention may also include water-reducible acrylic resins, prepared by reacting suitable acrylic and other ethylenically unsaturated monomers, including acid functional monomers, by conventional solution polymerization techniques and dispersing into a mixture of water and amine. Preparation of these types of water-reducible acrylic resins is described in U.S. Pat. No. 5,096,954. The water-reducible acrylic resin may be present in an amount ranging from about 0 to 5% by weight, preferably about 2.5% by weight, based on total weight of resin solids. The solids content of the aqueous dispersion is usually in the range of about 10 to 50%, preferably 20 to about 25% by weight, based on total weight of the aqueous dispersion.

The aqueous dispersion may also contain one or more coalescing solvents which may be the same as or different than the organic cosolvents mentioned above. Examples include propylene carbonate, glycols including ethylene glycol, diethylene glycol, propylene glycol, polypropylene glycol, and 2,2,4-trimethyl pentane-1,3-diol, glycol ether alcohols including ethylene glycol butyl ether, diethylene glycol butyl ether, ethylene glycol hexyl ether, propylene glycol methyl ether, propylene glycol propyl ether, and propylene glycol phenyl ether, lower alcohols including isopropanol, butanol, p-amyl alcohol, and tridecyl alcohol, and the like. Ethylene glycol hexyl ether is preferred. The coalescing solvent may be present in amounts ranging from about 5 to 40% by weight, preferably about 15 to 30% by weight based on total solids weight of the aqueous dispersion.

The aqueous dispersion may also include an aminoplast crosslinking agent containing methylol and/or methylol ether groups. Aminoplast condensates are obtained from the reaction of formaldehyde with an amine or amide. The most common amines or amides are melamine, urea, or benzoguanamine, and are preferred. The aminoplast may be present in an amount ranging from 0 to about 35% by weight, preferably from 0 to about 30% by weight based on the total weight of resin solids.

The aqueous dispersion will also preferably contain catalysts to accelerate the cure of any aminoplast in the formulation. Examples of suitable catalysts are acidic materials and include sulfonic acid or a substituted sulfonic acid such as paratoluene sulfonic acid and dodecylbenzene sulfonic acid. The catalyst is usually present in an amount of about 0.5 to 5.0% by weight, preferably about 1 to 2% by weight, based on total weight of resin solids. Optional ingredients such as, for example, surfactants, wetting agents, thickeners, pigments, and fillers and similar additives conventional in the art may be included in the aqueous dispersion. These ingredients are typically present at up to 25% by weight based on the total weight of solids of the aqueous dispersion.

Although the aqueous dispersions of the present invention may be applied to various substrates including wood, metals, and glass, they are particularly effective as adhesion promoters over plastic substrates. By "plastic" is meant any of the common thermoplastic or thermosetting synthetic nonconductive materials, including thermoplastic olefins such as polyethylene and polypropylene, thermoplastic urethane, polycarbonate, sheet molding compound, reaction-injection molding compound, acrylonitrile-based materials, nylon, and the like.

The aqueous dispersion of the present invention may be applied to a substrate by any conventional coating technique such as brushing, spraying, dipping or flowing, but spray applications are preferred. Any of the known spraying techniques may be employed such as compressed air spraying and either manual or automatic methods.

The aqueous dispersion of the present invention may be applied to a plastic substrate with or without pretreatment of the substrate. Such pretreatment may include, for example, plasma treatment, flame treatment, abrasive sanding, and/or chemical cleaning with a solvent such as ethanol, methanol, naphtha, mineral spirits, methyl isobutyl ketone, acetone, or other suitable solvents.

After application of the aqueous dispersion, the coated substrate is flashed at room temperature and then optionally baked. In the baking operation solvents are driven off. The baking operation is usually carried out at a temperature in the range of from 160°–275° F. (71°–135° C.) for approximately 30 minutes, but lower or higher temperatures and times may be used as necessary. The dry film thickness of the coating is usually from about 0.1–0.5 mils. A pigmented primer and/or a pigmented basecoat composition which is different from the aqueous dispersion containing the modified chlorinated polyolefin may subsequently be applied on top of the film of the aqueous dispersion. A clear coating composition may optionally be applied to the continuous film of the basecoat. The primer and/or basecoat and clearcoat may be applied after baking the film of the aqueous dispersion, or may be applied in a "wet-on-wet" configuration prior to the baking operation.

The invention will be further described by reference to the following examples. Unless otherwise indicated, all parts are by weight.

EXAMPLE A

A reaction vessel equipped with stirrer, condenser, and thermometer was charged at ambient temperature with 48.4 g (0.262 mol) undecylenic acid and heated to 70° C. At this temperature 50.5 g CP343-1[1] were charged and the mixture heated to 80° C. Another 50.5 g of CP343-1 were charged followed by heating of the reaction mixture to 90° C. A final 50.6 g of CP343-1 were charged followed by heating of the reaction mixture to 100° C. At this temperature, CADOX BFF-50[2] was added and the reaction mixture stirred for two hours. The reaction mixture was then cooled to 90° C. and 23.3 g (0.262 mol) of dimethyl ethanolamine were added followed by 32.0 g HEXYL CELLOSOLVE-[3] and 8.0 g n-butanol. 609.9 g of hot water were added to disperse the reaction mixture. The resulting product had a solids content of 23.6 percent by weight and a Brookfield viscosity of 105 centipoise (No. 2 spindle, 60 rpm).

[1] A chlorinated polyolefin (containing about 20.7% by weight chlorine) available from Eastman Chemical Products, Inc.
[2] 50 percent by weight benzoyl peroxide (free radical initiator) in free-flowing granular form available from Akzo Chemicals Inc.
[3] Ethylene glycol monohexyl ether available from Union Carbide Chemicals and Plastics Company, Inc.

COMPARATIVE EXAMPLE B

This example illustrates the elimination of the free radical initiator from the dispersion preparation.

A reaction vessel equipped with stirrer, condenser and thermometer was charged at ambient temperature with 48.4 g (0.262 mol) undecylenic acid and heated to 70° C. At this temperature 50.5 g CP343-1 were charged and the mixture heated to 80° C. Another 50.5 g of CP343-1 were charged followed by heating of the reaction mixture to 90° C. A final portion of CP343-1 (50.6 g) was charged followed by heating to 100° C. At this temperature, the reaction mixture was stirred for two hours. Then the reaction was cooled to 90° C. and 23.3 g (0.262 mol) of dimethyl ethanol amine were added followed by 32.0 HEXYL CELLOSOLVE and 8.0 g n-butanol. Hot water (317.4 g) was added to the reaction mixture. The water addition was stopped at this time because large undispersed chunks of resin were present accompanied by much foaming.

EXAMPLE C

This example illustrates the use of another glycol ether solvent in preparing a modified chlorinated polyolefin dispersion of the invention.

A reaction vessel equipped with stirrer, condenser and thermometer was charged at ambient temperature with 48.4 g (0.262 mol) undecylenic acid and heated to 70° C. At this temperature 50.5 g CP343-1 were charged and the mixture heated to 80° C. Another 50.5 g of CP343-1 were charged followed by heating of the reaction mixture to 90° C. A final portion of CP343-1 (50.6 g) was charged followed by heating to 100° C. At this temperature, CADOX BFF-50 was added and the reaction mixture stirred for two hours. Then the reaction was cooled to 90° C. and 23.3 g (0.262 mol) of dimethyl ethanol amine were added followed by 32.0 DOWANOL PPh[1]. Hot water (609.9 g) was added to disperse the reaction material. The resulting product had a solids content of 28.8 percent by weight and a viscosity of 44.1 centipoise (Brookfield viscosity, No. 2 spindle, 60 rpm).

[1] Propylene glycol phenyl ether available from Dow Chemical Corp.

EXAMPLE D

This example illustrates the use of another unsaturated hydrocarbon acid in preparing a modified chlorinated polyolefin dispersion of the invention.

A reactor flask equipped with a double down thrust blade, condenser and thermometer was charged with 75.5 g (0.267 mol) oleic acid, 124.5 g CP343-1, and 20 g CADOX BFF-50, the mixture heated to 100° C. over 50 minutes. At 61° C. the mass began to melt and became homogeneous by 70° C. The reaction mixture was heated to 100° C., stirred for two hours, and 40 g DOWANOL PPh were added followed by cooling the mixture to 90° C. Then 23.8 g dimethyl ethanol amine were charged followed by a one hour addition of hot water (600.0 g). The resulting dispersion had a solids content of 25.7 percent by weight and a viscosity of 930 centipoise (Brookfield viscosity, No. 3 spindle, 60 rpm).

EXAMPLE E

This example illustrates the use of a saturated hydrocarbon acid in preparing a modified chlorinated polyolefin dispersion of the invention.

A reactor flask equipped with a double down thrust blade, condenser and thermometer was charged with 52.6 g (0.263 mol) lauric acid, 147.4 g CP343-1, and 20 g CADOX BFF-50, the mixture heated to 100° C. over 50 minutes. At 61° C. the mass began to melt and became homogeneous by 70° C. The reaction mixture was heated and stirred for two hours at 100° C. 40 g DOWANOL PPh were then added followed by cooling the mixture to 90° C. Then 23.4 g dimethyl ethanol amine were charged followed by a one hour addition of hot water (600.0 g). The resulting dispersion had a solids content of 20.6 percent by weight, a viscosity of 142 centipoise (Brookfield viscosity, No. 1 spindle, 30 rpm), pH of 7.41, an acid content of 0.426 meq acid per gram, a base content of 0.239 meq base per gram and a particle size of 1100 Angstroms.

EXAMPLE F

This example illustrates the use of a diunsaturated hydrocarbon acid in preparing a modified chlorinated polyolefin of the invention.

A reactor flask equipped with a double down thrust blade, condenser and thermometer was charged with 68.6 g (0.229 mol) ricinoleic acid, 132.0 g CP343-1, and 20 g CADOX BFF-50, the mixture heated to 100° C. over 50 minutes. The reaction mixture was stirred for two hours. 40 g DOWANOL PPh were then added followed by cooling the mixture to 90° C. Then 20.4 g dimethyl ethanol amine were charged followed by a one hour addition of hot water (600.0 g). The resulting dispersion had a solids content of 25.7 percent by weight, a viscosity of 528 centipoise (Brookfield viscosity, No. 1 spindle, 6 rpm), pH of 7.60, an acid content of 0.316 meq acid per gram, a base content of 0.222 meq base per gram and a particle size of 2370 Angstroms.

EXAMPLE G

This example illustrates the use of another free radical initiator in the modified chlorinated polyolefin dispersion of the invention.

A reactor flask equipped with a double down thrust blade, condenser and thermometer was charged with 151.6 g (0.263 mol) undecylenic acid, 151.6 g CP343-1, and 10.7 g t-butyl peroxy-2-ethylhexanoate, and the mixture heated to 100° C. over 50 minutes. The reaction mixture was stirred for two hours. 40 g DOWANOL PPh were then added followed by cooling the mixture to 90° C. Then 23.3 g dimethyl ethanol amine were charged followed by a one hour addition of hot water (609.9 g). The resulting dispersion had a solids content of 20.9 percent by weight, a viscosity of 8.8 centipoise (Brookfield viscosity, No. 1 spindle, 60 rpm), pH of 7.44, an acid content of 0.385 meq acid per gram, a base content of 0.248 meq base per gram and a particle size of 718 Angstroms.

EXAMPLE H

This example illustrates the use of an azo free radical initiator in the modified chlorinated polyolefin dispersion of the invention.

A reactor flask equipped with a double down thrust blade, condenser and thermometer was charged with 48.4 g (0.263 mol) undecylenic acid, 151.6 g CP343-1, and 10.7 g VAZO-52[1] and the mixture heated to 100° C. over 40 minutes. The reaction mixture was stirred for two hours. 40 g DOWANOL PPh were then added followed by cooling the mixture to 90° C. Then 23.3 g dimethyl ethanol amine were charged followed by a one hour addition of hot water (609.9 g). The resulting dispersion had a solids content of 24.0 percent by weight, a viscosity of 24.7 centipoise (Brookfield viscosity, No. 1 spindle, 60 rpm), pH of 7.27, an acid content of 0.478 meq acid per gram, a base content of 0.310 meq base per gram and a particle size of 1520 Angstroms.

[1] 2,2'-Azobis(2,4-dimethylpentanenitrile) available from E. I. DuPont de Nemours and Company.

EXAMPLE I

This example illustrates the use of another neutralizing amine in the modified chlorinated polyolefin dispersion of the invention.

A reactor flask equipped with a double down thrust blade, condenser and thermometer was charged with 48.4 g (0.263 mol) undecylenic acid and 151.6 g CP343-1 and this mixture heated to 80° C. A slurry of 20.0 g CADOX BFF-50 and 40.0 g DOWANOL PPh was charged and the reaction mixture heated to 100° C. The reaction mixture was stirred for two hours followed by cooling to 90° C. Then 35.0 g diisopropanol amine were charged followed by a one hour addition of hot water (880.0 g). The resulting dispersion had a solids content of 17.6 percent by weight, a viscosity of 10.0 centipoise (Brookfield viscosity, No. 1 spindle, 60 rpm) and a pH of 7.27.

COMPARATIVE EXAMPLE J

This example illustrates the use of methacrylic acid as a substitute for undecylenic acid on an equivalents basis in the modified chlorinated polyolefin dispersion of the invention.

A reactor flask equipped with a double down thrust blade, condenser and thermometer was charged with 16.8 g (0.195 mol) methacrylic acid and 129.0 g CP 343-1 and this mixture was heated to 80° C. A slurry of 14.6 g CADOX BFF-50 and 29.2 g DOWANOL PPh was charged and the thick reaction mixture was heated to 100° C. An exotherm accompanied the heating. The reaction temperature was stabilized at 100° C. and the reaction mixture was stirred for two hours. The reaction mixture was cooled to 90° C. and 26.0 g diisopropanol amine were added. Hot water (643.3 g) was added to the thick reaction melt. The addition was stopped after one-third of the water was added because the resulting paste was too thick to stir and the hot water was not being incorporated into the dispersion.

EXAMPLE 1

Part (a) of this example illustrates the preparation of an adhesion promoting primer composition according to the invention. Part (b) of this example illustrates the application, curing and resultant properties of the composite coating compositions.

(a) The components as set forth in the following Table I are mixed together.

TABLE I

| Coating Composition Component | Promoter I | Promoter II | Promoter III (Comparative) |
|---|---|---|---|
| Reaction Product of Example I | 212.0 g | 212.0 g | — |
| Eastman CF310-W[1] | — | — | 116.3 g |
| Black Pigment Dispersion[2] | 117.0 g | 118.0 g | 118.0 g |
| TiO$_2$ Pigment Dispersion[3] | 48.0 g | 33.0 g | 33.0 g |
| RHOPLEX AC-264[4] | — | 63.0 g | 63.0 g |
| CYMEL 1130[5] | 19.0 g | — | — |
| RESIMENE 755[6] | 6.0 g | — | — |
| Acrylic Urethane Latex[7] | 36.6 g | — | — |
| Catalyst[8] | 10.0 g | — | — |
| HEXYL CELLOSOLVE | 35.0 g | 19.0 g | 19.0 g |
| Deionized Water | 75.0 g | 25.0 g | 25.0 g |
| Isopropanol | — | 10.0 g | 10.0 g |

[1]Commercially available waterborne dispersion of CP343-1 (chlorinated polyolefin) from Eastman Chemical.
[2]The black pigment dispersion consists of 4.3 pbw of propylene glycol monomethyl ether; 4.3 pbw n-propoxy propanol; 88.6 pbw deionized water; 303 pbw of a water reducible polyurethane containing 40.6% diisocyanate, 22.3% neopentyl glycol-adipate polyester, 22.3% polyether polyol, 9.1% dimethylol propionic acid, 2.5% ethylene diamine, 1.7% neopentyl glycol, 1.1% propylene imine, and 0.45% butanol with a weight average molecular weight of about 100,000 and a viscosity of about 200–500 cps; 40 pbw of conductive carbon black (XC-72R available from Cabot).
[3]The titanium dioxide dispersion consists of 4.1 pbw of propylene glycol monomethyl ether; 5.8 pbw deionized water; 28.4 pbw of a water reducible acrylic containing 35% butyl acrylate, 30% styrene, 18% butyl methacrylate, 8.5% hydroxyalkyl acrylate, and 8.5% acrylic acid with a weight average molecular weight of about 90,000 and a viscosity of about 500 cps; 61.5 pbw titanium dioxide; 0.2 pbw amine.
[4] 4 Acrylic latex available from Rohm and Haas.
[5]Aminoplast crosslinking agent available from American Cyanamid Company.
[6]Aminoplast crosslinking agent available from Monsanto Chemical Company.
[7]As described in U.S. Pat. No. 5,071,904.
[8]Dodecylbenzenesulfonic acid neutralized with diisopropanolamine; 10% in 1/1 isopropanol/water.

(b) The above three adhesion promoter compositions of part (a) were spray applied at 0.25 mils in one coat at ambient atmospheric conditions to thermoplastic polyolefin substrates (available as ETA-3041C and ETA 3183 from Himont Advanced Materials). The resulting films were force dried at 180° F. for six minutes. Immediately thereafter, the coatings were topcoated first with 1.0 mil of a white universal basecoat composition (available as CBC-90934 from PPG Industries, Inc.) and next, wet-on-wet (i.e., before allowing the basecoat to dry) with 1.5 mil of a transparent universal clearcoat composition (available as UCC-1001 from PPG Industries, Inc.). The resultant composite films were cured at 250° F. for 30 minutes and the properties were determined.

The results are set forth in Table II. Terms and abbreviations in Table II have the meanings set forth below.

"DFT" means dry film thickness in mils.

"Tricut" refers to adhesion of the composite film to the substrate according to Ford laboratory test method. BI106-1 using Nichiban tape. The values refer to the number of triangles not removed after four tape pulls.

"Solvent Soak" means resistance in minutes ("min.") of the composite film (coating) to "lifting" from the coated substrate after immersion in a 50/50 mixture (by volume) of toluene and VM & P naphtha.

"Adhesion-H" refers to adhesion of the composite film to the substrate after 240 hours in a humidity chamber operating at 100 percent relative humidity and 37.8° C. using ASTM 3359-B.

"Thermal Shock" is an indication of whether the composite coating passed (P) or failed (F) the paint adhesion test as described in Ford laboratory test method BI7-5. The test involves immersion of a coated panel in water at about 40° C. for four hours, followed immediately by freezing at about −30° C. for three hours. After the freeze cycle, the panel is inscribed with an "X" and blasted with high pressure steam for at least 30 seconds. The panel is then inspected for loss of coating adhesion.

"Cold Bend" refers to the degree to which the composite coating cracks when the substrate (ETA-3041C) is cooled to 0° F. and bent around a ⅛ inch mandrel. The values for this test range from 0 to 10. A value of 10 means there was no cracking of the composite coating.

TABLE II

| Composition | DFT | Tricut | Solvent Soak | Adhesion-H | Thermal Shock | Cold Bend |
|---|---|---|---|---|---|---|
| Promoter I | 0.25 | 100 | 40–60 min. | 100 | F | 6–8 |
| Promoter II | 0.25 | 100 | 40–60 min. | 100 | P | 9–10 |
| Promoter III | 0.25 | 85 | 10–25 min. | 100 | F | 9 |

We claim:

1. An aqueous dispersion comprising water, a coalescing solvent, and a dispersed resinous phase comprising:
   (a) about 20 to about 100% by weight of an at least partially neutralized modified chlorinated polyolefin obtained by heating a chlorinated polyolefin with a hydrocarbon acid having at least 7 carbon atoms in the presence of a free radical initiator, said modified chlorinated polyolefin dispersed in water with an organic cosolvent;
   (b) about 0 to about 40% by weight of a water-reducible urethane resin; and
   (c) about 0 to about 40% by weight of an acrylic latex;
wherein the weight percentages are based on total weight of resin solids.

2. The aqueous dispersion of claim 1, wherein said hydrocarbon acid contains from about 11 to about 20 carbon atoms.

3. The aqueous dispersion of claim 1 wherein said hydrocarbon acid is unsaturated.

4. The aqueous dispersion of claim 2, wherein said hydrocarbon acid is selected from the group consisting of lauric acid, oleic acid, ricinoleic acid, and undecylenic acid.

5. The aqueous dispersion of claim 4, wherein said hydrocarbon acid is undecylenic acid.

6. The aqueous dispersion of claim 1, wherein said modified chlorinated polyolefin is at least partially neutralized with an amine.

7. The aqueous dispersion of claim 1, wherein said chlorinated polyolefin has a chlorine content of from about 10 to about 40 weight percent based on the weight of polyolefin.

8. The aqueous dispersion of claim 7, wherein said chlorinated polyolefin has a chlorine content of from about 10 to about 30 weight percent based on the weight of polyolefin.

9. The aqueous dispersion of claim 1, wherein the acid value of said modified chlorinated polyolefin is in the range of about 50 to about 100.

10. The aqueous dispersion of claim 1, wherein the solids content thereof is in the range of about 20 to about 25% by weight based on total weight of the aqueous dispersion.

11. The aqueous dispersion of claim 1, wherein (a) is present in amounts of about 30 to 40% by weight.

12. The aqueous dispersion of claim 1, wherein (b) is present in amounts of about 20 to 30% by weight.

13. The aqueous dispersion of claim 1, wherein (c) is present in amounts of about 35 to 45% by weight.

14. A method of coating a plastic substrate surface which comprises applying an aqueous dispersion to the surface of the substrate, wherein the aqueous dispersion comprises water, a coalescing solvent, and a dispersed resinous phase comprising:
   (a) about 20 to about 100% by weight of an at least partially neutralized modified chlorinated polyolefin obtained by heating a chlorinated polyolefin with a hydrocarbon acid having at least 7 carbon atoms in the presence of a free radical initiator, said modified chlorinated polyolefin dispersed in water with an organic cosolvent;
   (b) about 0 to about 40% by weight of a water-reducible urethane resin; and
   (c) about 0 to about 40% by weight of an acrylic latex;
wherein the weight percentages are based on total weight of resin solids.

15. The method of claim 14, wherein said hydrocarbon acid contains from about 11 to about 20 carbon atoms.

16. The method of claim 14, wherein said hydrocarbon acid is unsaturated.

17. The method of claim 15, wherein said hydrocarbon acid is selected from the group consisting of lauric acid, oleic acid, ricinoleic acid, and undecylenic acid.

18. The method of claim 17, wherein said hydrocarbon acid is undecylenic acid.

19. The method of claim 14, wherein said modified chlorinated polyolefin is at least partially neutralized with an amine.

20. The method of claim 14, wherein said chlorinated polyolefin has a chlorine content of from about 10 to about 40 weight percent based on the weight of polyolefin.

21. The method of claim 20, wherein said chlorinated polyolefin has a chlorine content of from about 10 to about 30 weight percent based on the weight of polyolefin.

22. The method of claim 14, wherein the acid value of said modified chlorinated polyolefin is in the range of about 50 to about 100.

23. The method of claim 14, wherein the plastic substrate is selected from the group consisting of polyethylene, polypropylene, thermoplastic urethane, and polycarbonate.

24. The method of claim 14, wherein a pigmented coating composition is applied over the aqueous dispersion on the substrate surface.

25. The method of claim 24, wherein a clear coating composition is applied over the pigmented coating composition on the substrate surface.

26. The method of claim 14, wherein the solids content of said aqueous dispersion is in the range of about 20 to about 25% by weight based on total weight of the aqueous dispersion.

27. The method of claim 14, wherein (a) is present in amounts of about 30 to 40% by weight.

28. The method of claim 14, wherein (b) is present in amounts of about 20 to 30% by weight.

29. The method of claim 14, wherein (c) is present in amounts of about 35 to 45% by weight.

30. The method of claim 14, wherein the plastic substrate is sheet molding compound.

* * * * *